April 7, 1970   F. J. WALKER   3,505,504
ALTITUDE PACER SYSTEM
Filed Dec. 21, 1967   2 Sheets-Sheet 1
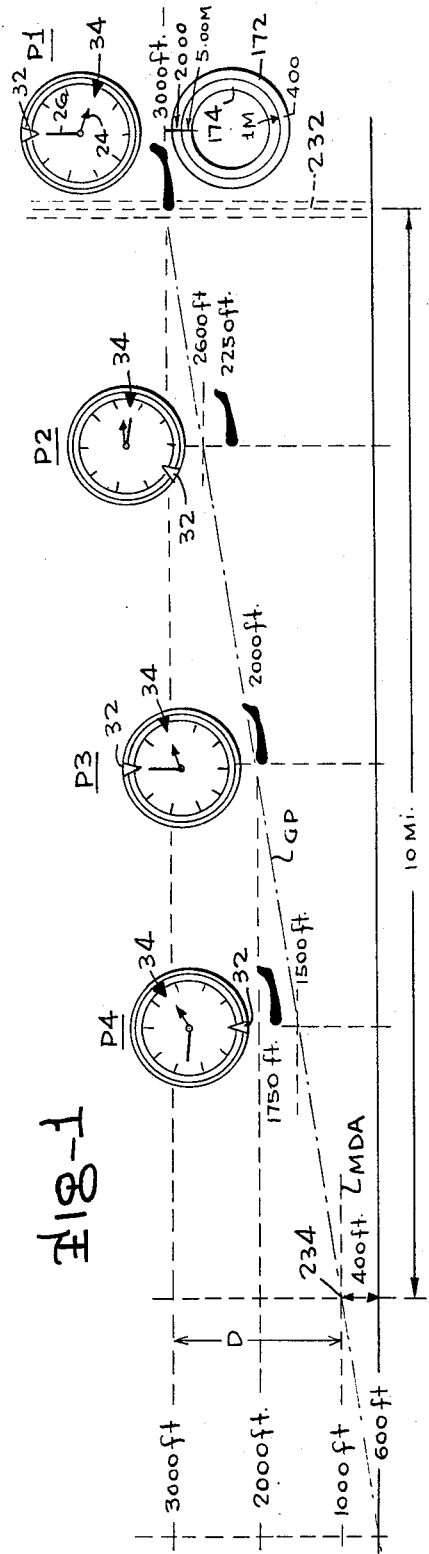
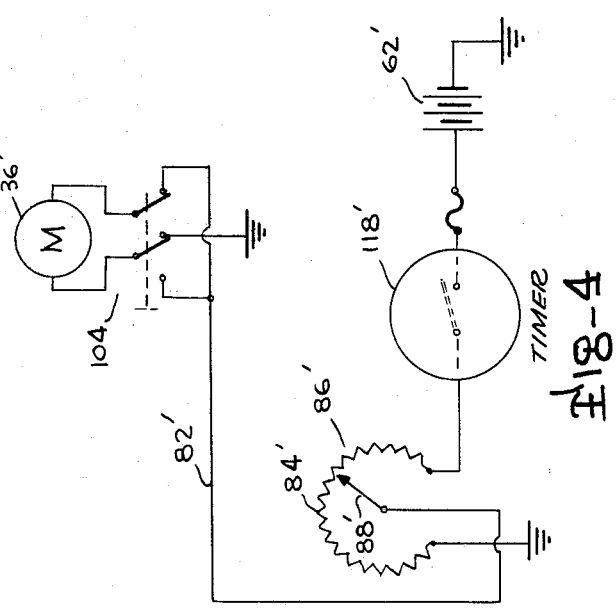
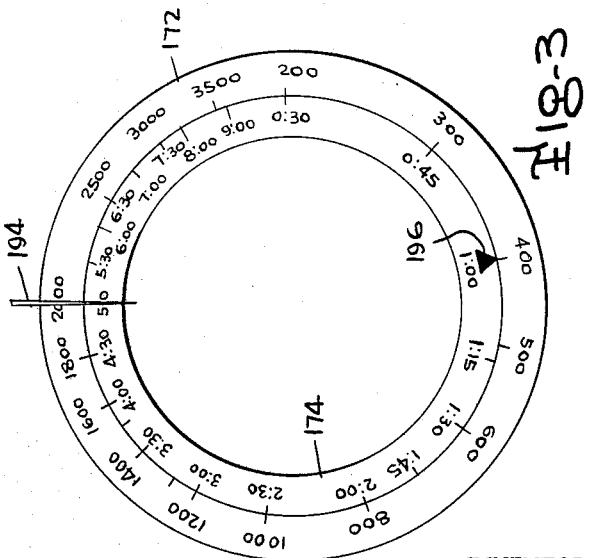
INVENTOR
FRANK J. WALKER
BY Mason, Fenwick & Lawrence
ATTORNEYS April 7, 1970 F. J. WALKER 3,505,504

ALTITUDE PACER SYSTEM

Filed Dec. 21, 1967 2 Sheets-Sheet 2

INVENTOR

FRANK J. WALKER

BY Mason, Fenwick & Lawrence

ATTORNEYS

United States Patent Office 3,505,504
Patented Apr. 7, 1970

3,505,504
ALTITUDE PACER SYSTEM
Frank J. Walker, 9800 NE. 5th Ave. Road,
Miami Shores, Fla. 33153
Filed Dec. 21, 1967, Ser. No. 692,451
Int. Cl. G01c 5/06
U.S. Cl. 235—150.22                             15 Claims

ABSTRACT OF THE DISCLOSURE

A pacer system for association with an aircraft altimeter including driven pacer elements spaced adjacent the altimeter dial and driven at a desired speed by a selectively variable speed drive controlled by a manually settable speed control, and means into which the number of feet altitude change desired and the desired time required for the altitude change are manually entered to provide an output to actuate the drive at a required speed so as to provide the proper output speed for the pacer elements in accordance with the desired altitude change input information over the desired period of time.

BACKGROUND OF THE INVENTION

This invention relates to aircraft instruments, and more specifically relates to an instrument for enabling a controlled rate of altitude change for a given time period.

It is often necessary during the course of an aircraft flight to make precise altitude changes from a first altitude to a second altitude at a given rate of altitude change. Such changes are most commonly associated with the descent of aircraft during a landing approach. However, it is often necessary to maintain a given rate of climb following takeoff from an airport or while en route.

Practically all aircraft are provided with barometric "rate of climb" indicator devices which function in a fairly satisfactory manner for providing an indication of the rate of altitude change at any given moment. However, the use of such instruments in situations requiring a constant rate of altitude change for a considerable time period as, for example, during the approach to an airport, requires that the pilot maintain a constant watch on the rate of climb indicator. Unfortunately, the pilot must also concurrently maintain vigilance for other aircraft or other exterior hazards in the area while also performing other procedures necessary for the proper flying of the aircraft. Therefore, it is practically impossible for the pilot to maintain a close watch on the rate of climb indicator for any substantial period of time.

Moreover, aircraft often encounter rough air caused by updrafts and downdrafts which prevent the pilot from maintaining a given constant rate of altitude change along a desired glide or climb path even if he should be completely free to monitor the rate of climb indicator constantly. For example, during the landing approach when an aircraft hits an updraft, the pilot knows that he will have to increase his rate of descent in order to compensate for the movement of the aircraft caused by the updraft. However, such compensating maneuvers must be made solely upon instinct and the pilot has no way of knowing whether or not he has returned to the desired glide path following the completion of such compensating maneuvers.

The problem of maintaining a constant rate of descent or ascent is of particular criticality when operating under instrument flight conditions where the pilot does not have ground contact for visual reference, and therefore, must rely solely on his instruments to maintain flight attitude and position. For example, it is imperative that an aircraft maintain a required constant rate of descent for landing at an airport having low ceilings and/or visibility. Such conditions require an instrument approach and it is absolutely essential that the proper rate of descent be maintained.

Approach and departure procedures are provided on charts published by the United States Coast and Geodetic Survey for certain airports in this country. Such charts provide a vast amount of information concerning each of such airports, such as, for example, elevation of the airport above sea level, minimum ceilings, approach fixes or locator points and numerous other items of value to the pilot, to provide the pilot with any and all information required to perform an instrument approach without visual ground contact. The approach procedures require that an aircraft should maintain a constant heading and rate of descent from a specified radio navigational "fix" or electronically located point so as to follow a given glide path inbound to the airport from the subject "fix" or point. The inbound fix or radio located point can be detected by a number of ways common to the art in accordance with the particular electronic equipment employed at the particular airport, and operational appropriate airborne receiving equipment within the aircraft.

When approaching a facility for landing, the pilot consults his appropriate approach chart for the required approach procedure and proceeds to fly at the specified altitude until he flys over the inbound fix point indicated by the vertically radiated radio beam, the intersection of two beams or by some other electronic indicator. The approach procedure chart indicates the required magnetic heading and time for descent from this inbound fix to the break-out point where the glide path intersects the minimum descent altitude for the particular approach. The time required is determined by the particular aircraft's ground speed and the distance of the inbound fix from the break-out point. Failure to maintain the proper rate of descent can result in the aircraft missing (overshooting) the airport and, in some instances, may well result in collision with the surrounding terrain by undershooting. Failure to complete a landing approach can also be of critical importance in situations wherein the aircraft is low on fuel and might consequently be unable to complete a second approach.

While many of the large metropolitan airports in this country are provided with an ILS approach which employs a glide slope beam electronically radiated from the airport along the glide slope path, an aircraft having the proper equipment can follow the glide slope beam for landing without undue difficulty, it is an unfortunate fact that such equipment is installed in only a relatively few locations. Moreover, such equipment is extremely complicated and susceptible to malfunctions so as to frequently be unavailable for use. These facts coupled with the inherent shortcomings of the rate of climb indicators employed in aircraft have created a great need for a reliable self-contained aircraft system for enabling an aircraft pilot to maintain a desired rate of altitude change over an extended time period. This invention meets this need.

Therefore, it is the primary object of this invention to provide a new and improved means for enabling a pilot to accurately maintain a constant rate of altitude change for a considerable time period.

This invention enables the pilot of an aircraft to determine whether or not he has maintained a proper rate of altitude change by a simple glance at his altimeter. Furthermore, the invention enables the pilot to make correctional altitude changes to bring the aircraft back to a desired path of travel, such as a glide slope, subsequent to movement of the aircraft from the glide path as, for example, caused by updrafts or downdrafts affecting the aircraft's position. As a consequence, the subject invention, as compared to the prior art devices, does not require constant monitoring and leaves the pilot relatively free to perform the multitude of tasks inherent in landing operations.

SUMMARY OF THE INVENTION

The preferred embodiment of the invention comprises the provision of first and second pacer pointers mounted for rotation in front of a conventional aircraft altimeter face. The altimeter hands and the pointers rotate about a common axis of rotation and a variable speed reversible motor is provided for drivingly rotating the pointers in either a desired clockwise or a counterclockwise direction at a required speed. A ten to one step-down gear drive relationship between the pacer pointers serves to move one of the pointers at a speed ten times greater than the speed of the other pointer in the same manner as the two pointers of the altimeter are moved with respect to each other. Manual setting means is provided for initially adjusting the pacer pointer to any desired initial altitude reading prior to the beginning of an altitude change maneuver. When the aircraft is maneuvered to the proper desired initial altitude, the altimeter hands will, therefore, be in alignment with the pacer pointers. Actuation of the drive motor for the pacer pointer causes same to rotate at given constant angular speed and controlling the aircraft so that the altimeter hands remain in following alignment with the moving pacer pointers causes the aircraft to maintain a constant rate of altitude change. The speed with which the pacer pointers are driven determines the rate of altitude change and the pointers provide a constant indication of the altitude at which the aircraft should be at any particular time for a particular altitude change maneuver.

Speed control means for controlling the speed of the pacer pointer driving motor includes an instrument panel mounted outer and inner coaxial rotatable rings in the form of a circular slide rule. These rings are manually selectively rotated to their desired positions respectively indicating the feet of altitude change desired and the time required for the change. A stationary wire index member extends across both rings to enable proper positioning of the rings. The outer ring is provided with a logarithmic numerical scale of numbers over a reasonably anticipated numerical range representing the number of feet of ascent or descent desired for any particular altitude change maneuver and the inner scale is provided with a logarithmic time scale over a reasonably anticipated numerical range in minutes and seconds representing the time desired for effecting such an altitude change maneuver. When the outer ring and the inner ring have been adjusted in accordance with the feet of altitude change desired and the time for such changes respectively, their relative positions are indicative of the rate of change in feet per minute. This is a circular sliderule operation wherein altitude change (in feet) would be divided by time (in minutes and seconds) to determine the quotient, i.e., rate of altitude change in feet per minute. This rate is indicated by the one minute time index mark on the inner scale which is aligned with the computed rate on the outer scale.

The relative position of the rotatable rings of the circular slide rule is, therefore, indicative of the rate of altitude changes desired, and it is necessary that this information be converted into a required speed control signal for the motor. This conversion is enabled by two gear trains respectively connected to the wiper and the resistor elements of a linear rotary potentiometer. The first gear train extends from the outer ring and includes a pair of logarithmic linearizing conversion gears for converting the logarithmic rotation of the outer ring to a linear rotation. The output of the first gear train is to a rotatable shaft upon which the wiper contact member of the rotary potentiometer is mounted. The second gear train also includes a pair of logarithmic linearizing gears for converting the rotation of the inner ring to a linear output rotation of a second output shaft. The rotary potentiometer's resistor element is attached to a supporting case which is attached to the second output shaft so that the case and the attached resistor element is rotatably positioned by rotation of the second output shaft. Therefore, each rate of altitude change set into the circular slide rule is resultant of a relative positioning of the potentiometer wiper member and resistor member with respect to each other indicative of the rate of altitude change. Electrical current for the drive motor is provided through the potentiometer so that the speed of the drive motor is ultimately proportional to the rate of altitude change set into the circular slide rule. The gearing between the motor and the pacer pointers is such that the pacer pointers traverse the dial of the altimeter at the desired rate of altitude change set into the circular slide rule. A manually selected reversing switch is provided in the power circuit of the motor so that the motor can be driven in either direction for either ascending or descending aircraft maneuvers.

Another feature of the invention is that the output from the second logarithmic gear train connected to the time (inner) ring of the circular slide rule also serves to set a timer means which provides a visual and/or aural warning when the desired time period for the maneuver has been completed and additionally breaks the circuit to the drive motor for the pacer pointers to stop pacing movement of such at the desired final altitude.

In operation, the amount of feet altitude change and the time required for such a change are initially inserted into the control system by manual positioning of the circular slide rule rings which consequently sets the motor controlling potentiometer to drive the motor at the proper speed corresponding to the required altitude rate of change. The pacer pointers are adjusted to an initial altitude and the aircraft is maneuvered to achieve this altitude. When it is desired to begin the controlled altitude change maneuver, the pilot actuates a push-button switch which connects the motor to a source of current flowing through the potentiometer and also initiates actuation of the timer. This actuation causes the pacer pointers to begin rotational movement at the desired constant speed and the pilot maneuvers the aircraft so that the altimeter hands follow the movement of the pacer pointer elements. The timer stops the rotation of the pacers at the end of the desired altitude change maneuver, and also provides a visual and/or audible warning shortly before, or concurrently with, arrival at the desired final altitude. The warning insures that the pilot will be aware of the completion of the altitude change maneuver.

An alternate simplified embodiment of the invention does not employ the instrument panel mounted circular slide rule and associated gear trains. Simple dials are provided: one for setting the motor controlling potentiometer to a desired rate of altitude change, and the other for setting a timer for the desired period of time. The desired rate of altitude change must be computed by a separate slide rule or computer used by the pilot. After the desired rate of altitude change and time have been inserted in the system so as to properly position the potentiometer and timer, the use of the second embodiment is identical with that of the preferred embodiment.

BRIEF DESCRIPTION OF THE DRAWINGS

FIGURE 1 is a pictorial illustration of an aircraft descending maneuver illustrating use of the subject invention;

FIGURE 3 is a front view of a typical manually settable rotary slide rule for controlling the preferred embodiment, and FIGURE 4 is a schematic illustration of an alternate simplified embodiment of the invention.

DESCRIPTION OF THE PREFERRED EMBODIMENT

Figure 2:
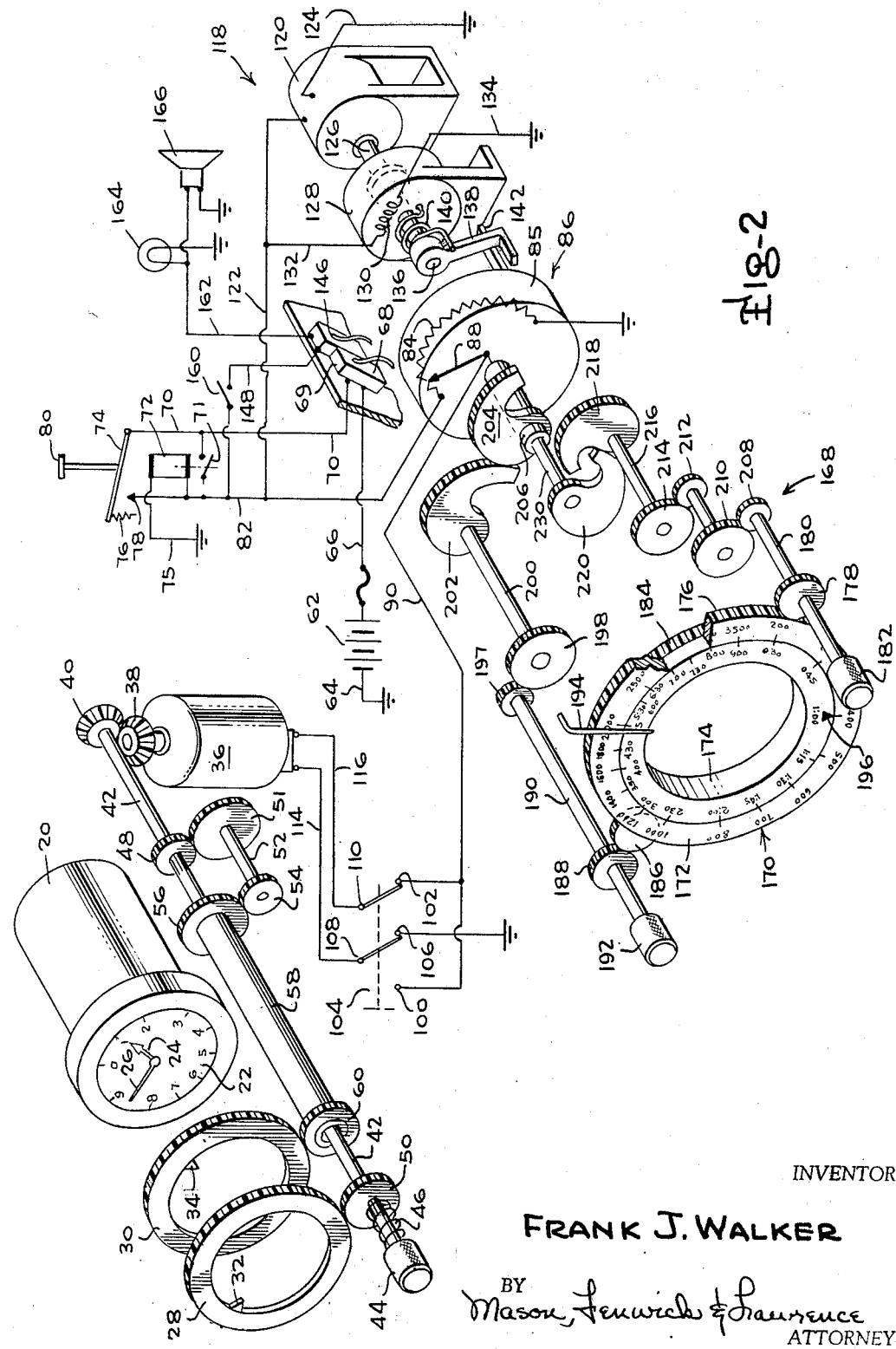
FIGURE 2 is a schematic illustration of the preferred embodiment of the invention.

The preferred embodiment of the invention is illustrated in FIGURE 2 and attention is initially invited thereto.

The inventive system is associated with a conventional altimeter 20. The altimeter 20 is provided with a dial 22 and has a short hand 24 for designating thousands of feet and a long hand 26 for designating hundreds (and fractions thereof) of feet. The hands move in well known manner during altitude changing maneuvers of the aircraft, with one hand having an angular rotation of ten times the other.

A pair of annular pacer gears 28 and 30 are mounted in suitable bearings closely adjacent the face of altimeter 20 for coaxial rotation with respect to each other and with respect to the hands of the altimeter. An inwardly extending brightly colored pacer pointer 32 is mounted on the interior circumference of gear 28 and a similar inwardly extending pacer pointer 34 of a different color and/or shape is mounted on the inner circumference of gear 30. The gears are supported by suitable bearing means for rotation and it should be noted that FIGURE 2 illustrates the gears in spaced axial relationship for purposes of clarity; whereas, the gears are actually in a closely adjacent relationship. Rotation of gears 28 and 30 causes pacer pointers 32 and 34 to traverse the periphery of dial 22 in an obvious manner.

Power for drivingly rotating the annular pacer gears is provided by a reversible selectively adjustable speed controlled motor 36 having a beveled gear 40 mounted on an axially shiftable shaft 42. Shaft 42 is mounted to be movable in an axial direction to the right, as illustrated in FIGURE 2, so that gear 40 can be disconnected from gear 38 when it is desired. The end of shaft 42 opposite to gear 40 is provided with a manual adjustment knob 44, which is engaged by a coiled spring or other suitable means for biasing shaft 42 leftward to normally maintain gears 40 and 38 in mesh. First and second output gears 48 and 50 are connected to shaft 42 by a splined connection so that only rotative movement of shaft 42 is conveyed to gears 48 and 50; however, axial movement of shaft 42, such as caused by inward movement of knob 44, is not conveyed to gears 48 and 50, and these gears remain in the position illustrated in FIGURE 2 when shaft 42 is shifted to disengage gears 38 and 40. Gear 48 meshes with a step-down gear 51 fixedly mounted on a shaft 52 which has gear 54 fixed to its other end. Gear 54 is, in turn, meshed with a larger gear 56 fixedly attached to the end of a hollow tubular shaft 58. The other end of tubular shaft 58 is provided with an output gear 60 which meshes with annular pacer gears 30, as shown; gear 50 meshes with annular gear 28 in a similar manner. Shaft 42 is coaxial with hollow tubular shaft 58 and is movable axially with respect thereto. Gears 51, 54 and 56 are selected so that shaft 58 makes a single rotation for every ten rotations of shaft 42. In other words, gears 51, 54 and 56 comprise a ten to one step-down drive for shaft 58. For this reason, pacer pointer 32 will rotate ten times faster than pacer pointer 34 in the same relative manner as hands 26 and 24 of the altimeter are rotated. Gears 28 and 30 are initially positioned at manufacture assembly, so that pacer pointers 32 and 34 would align over one another at the zero (0) altitude markings on altimeter face 22.

Electrical current for driving motor 36 is provided from a voltage source 62 connected to ground by line 64 and to a main power output line 66 which is connected to one terminal of a normally closed switch 68, fixed to a frame support member 69. The other terminal of switch 68 is connected by a line 70 to one side of a single pole double throw momentary switch 80 which has a movable contact arm 74 which is biased in an open position by a spring 76. Obviously, switch 80 could be any one of the many conventional push-button switches of the type normally biased to an open condition. Line 70 is also connected to the input contact points 71 of a relay 72. Depression of the actuator button on switch 80 causes an electrical connection to be made from line 70 through switch contact 78 to line 82. Line 82 is connected to one terminal of the coil of relay 72 and the other coil terminal is connected by line 75 to ground. Therefore, actuation of switch 80 causes current to flow through the relay coil to actuate the relay. Actuation of the relay closes the normally open relay contacts 71 to by-pass switch 80 and electrically latch the relay. The relay will obviously remain actuated regardless of the subsequent opening of switch 80 until current through line 70 is interrupted by the opening of the contacts of switch 68, as will be discussed hereinafter. Contact 78 of switch 80 is connected by line 82 to one end of an accurate linear-wound resistor element 84 attached to the support case 85 of a rotary potentiometer generally designated 86. The other end of the resistor element 84 is connected to ground, as shown. A movable contact wiper pointer 88 in the potentiometer is mounted for rotation so that the contact wiper contacts the resistor element 84 at any desired point along its length to provide a linearly variable output voltage tap to a line 90 electrically connected to the wiper.

Line 90 is connected to contacts 100 and 102 of a reversing switch 104. A contact 106 of the reversing switch is connected to ground and two other contacts 108 and 110 are connected to the terminals of motor 36 respectively by lines 114 and 116. It will be obvious that selective positioning of the reversing switch will cause current to flow through motor 36 in either direction in accordance with the position of the switch, so that the motor can be driven in either desired direction to rotate the pacer pointers 32 and 34 in either an "ascending" or "descending" direction in accordance with a desired A timer means for controlling the duration of operation of motor 36 is generally designated 118 and comprises a constant speed electric motor 120 which is connected to power line 82 by line 122 and to ground by line 124. The output shaft 126 of motor 120 is connected to a normally disengaged style of electric clutch 128 which includes a conventional actuator coil 130. Coil 130 is connected to line 122 by line 132 and to ground by line 134. It will be obvious that actuation of push-button 80 for initiating operation of the variable speed motor 136 will simultaneously initiate operation of constant speed motor 120 and actuation of clutch 128. Energizing coil 130 of clutch 128 actuates the clutch to connect shaft 126 to an output shaft 136 of the clutch. The outer extremity of shaft 136 is provided with a radially extending switch-actuating lever arm 138 keyed to the shaft. Lever arm 138 is biased in a clockwise direction by a coil spring 140 which has one end engaging the side of the lever arm and which has its other end affixed to the case of clutch 128, as shown in FIGURE 2; however, the clockwise movement of the lever arm 138 is limited by a stop lug 142, which extends from the case 85 of the rotary potentiometer 86. Therefore, when motor 120 and clutch 128 are disengaged, spring 140 rotates the lever arm 138 until stopped by lug 142 to assume the position illustrated in FIGURE 2. However, when motor 120 and clutch 128 are simultaneously actuated by depression of switch 80, the motor rotates lever arm 138 in a counter-clockwise direction away from contact with lug 142 toward limit switch 68 and warning actuating switch 146.

A warning system is incorporated in the control circuit for providing an optional visual and/or audible indication to the pilot when the selected timing cycle is approaching completion. The warning system includes a normally open switch 146 mounted on a support 69 in a position slightly above switch 68, as shown in FIGURE 2, for a reason to be discussed hereinafter. Switches 146 and 68 are positioned so as to be contacted by rotation of lever arm 138 as it rotates in a counter-clockwise direction. Switch 146 is adjusted to be actuated approximately three to five seconds before switch 69 is contacted. When lever arm 138 contacts switch 146, it closes the normally open contacts in the switch, and when the arm 138 subsequently contacts the switch actuator of switch 68, it opens the normally closed contacts in switch 68, thereby "tripping" relay 72, which in turn deactivates motors 36 and 120 and clutch 128. Therefore, all electrical power to the device is shut off and the entire mechanism is inoperative until switch 80 is again manually actuated to start another cycle of operation. Switch 146 is connected by line 148 having a manual disconnection or override switch 160 and which is connected to line 82, as shown in FIGURE 2. The other terminal of switch 146 is connected by line 162 to a lamp or other visual indicator 164 and to a horn or other suitable audible signal-producing means 166, which are connected in parallel to ground. It will be obvious that actuation of switch 146 will actuate the warning means; however, the warning means can be deactivated, if desired, by opening switch 160.

The computer includes an instrument panel mounted circular slide rule 170, which consists of a first or outer ring 172 and a second or inner ring 174. The rings 172 and 174 are coaxially concentric with respect to each other. Outer ring 172 is provided on its face with a logarithmic scale of numerical values representing the desired range in feet of altitude change, and inner ring 174 is provided with a desired range logarithmic scale of time values in minutes and seconds, representing the time desired for a particular altitude change maneuver. The periphery of ring 172 is provided with gear teeth 176, which mesh with a setting gear 178, keyed to shaft 180, which has a manual control knob 182 on its forward (cockpit) end. Similarly, ring 174 is provided with peripheral gear teeth 184, which mesh with an idler gear 186 which, in turn, meshes with a setting gear 188 fixed to a shaft 190 which has a manual setting knob 192 on its forward end. A stationary index wire 194 is mounted in the instrument panel and extends across the faces of rings 174 and 172, so that respective values on the logarithmic scales on each ring can be aligned with the index wire. Ring 172 is rotated to a desired position by rotation of manual knob 182 in an obvious manner and ring 174 is similarly rotated by rotation of manual knob 192. The example illustrated in FIGURES 2 and 3 illustrate an altitude change of two thousand (2000) feet aligned with a time of five (5) minutes in which to complete the altitude change. An index mark 196 at the one (1) minute position on the face of ring 174 is then aligned with the value "400" on the logarithmic scale of the outer ring 172 to indicate that the particular setting resulted in a rate of altitude change of 400 feet per minute. This has no particular significance insofar as the operation of the device is concerned as long as the variables (2000 feet of altitude change over a 5 minute period) are both properly aligned under index 194, or unless the pilot is furnished rate of altitude change as one of his original variables in place of time and altitude difference.

It is necessary that the particular rate of change of altitude desired and the time required for such a change be conveyed to the potentiometer and timer means previously discussed. However, since the scale on each of the rings are logarithmic, it is necessary that the logarithmic factors be converted to linear factors for setting potentiometer 86. This conversion is accomplished by gear trains extending from each ring including logarithmic conversion gears which will now be discussed.

An output gear 197 is mounted on the rear shaft 190 and meshes with a step-down gear 198 keyed to a shaft 200. The other end of shaft 200 is provided with a logarithmic linearizing gear 202 keyed thereto which, in turn, meshes with a mating logarthmic linearizing gear 204 fixed to a hollow tubular shaft 206. Logarithmic linearizing gears 202 and 204 are specially sized and contoured to convert a specified number of degrees of rotation relative to the logarithmic scale on ring 174 to a desired number of degrees of linear rotation at the output shaft 206. The other end of hollow shaft 206 is fixed to the case 85 of potentiometer 86. Therefore, it will be obvious that rotation of manual knob 192 so as to set logarithmically marked ring 174 will result in a subsequent linear rotation of the case 85 of the potentiometer to provide a corresponding linear setting of the potentiometer case and the resistor element 84 attached thereto in accordance with the particular logarithmic setting of ring 174.

Similarly, shaft 180 is provided at its rear end with a gear 208 which drives a series of speed reducing gears 210, 212 and 214. These gears are required in order to limit the maximum angular rotation of logarithmetic linearizing gears 218 and 220 inasmuch as these gears are not physically capable of operating over one revolution by virtue of their shape. Similarly, plural step-down gears can be incorporated between shafts 120 and 200 but have not been illustrated in order to avoid making the drawings overly complex and cluttered. Rotation of gear 214 which is attached to a shaft 216 causes logarithmic gear 218 to rotate a mating logarithmic gear 220 in an obvious manner. Gear 220 is keyed to a shaft 230 which is rotatably received within the open center of hollow shaft 206 and extends through the hollow shaft to support wiper or pointer member 88 of the potentiometer which is fixed to the end of shaft 230.

Therefore, rotation of manual setting knob 182 to set the outer ring 172 to a desired number of feet of altitude change for a particular maneuver results in the positioning of the movable contact wiper 88 in a corresponding position. The logarithmic gears 218 and 220 convert the log-logarithmic rotational characteristics of ring 172 to a linear output function in the same manner as gears 202 and 204 convert the logarithmic positioning of ring 174. Moreover, since stop lug 142 is attached to the case 85, setting of the time ring 174 provides a corresponding positioning of lug 142. Since the initial position of arm 138 is determined by the position of lug 142, the time required for rotation of arm 138 from its initial position engaging lug 142 to a position actuating switches 68 and 146 will be varied in accordance with the position of lug 142. The speed of motor 120 is such that the time required for making the rotation to the switches is equal to the time setting of ring 174 when aligned with index 194.

Similarly, the setting of movable contact wiper 88 and resistor element 84 with respect to each other provides an output drive voltage to motor 36 which drives motor 36 at a speed so that the pacer pointers move at the rate of altitude change required for the particular maneuver inserted in circular slide rule 70.

In the aforementioned description of operation when considering the matter of the rotation of potentiometer shaft wiper 88 and potentiometer case and resistance, it is of utmost importance to understand that the time period for the maneuver as selected on ring 174 is directly proportional to the angular displacement of potentiometer case 85 from its initial or "zero" position. Computer index 194 provides this required reference to the "zero" position so that aligning a particular of value of time to this index will *always* result in the corresponding angular displacement of potentiometer case 85 from its "zero" position. The speed of motor 36 is inversely proportional to the resistance of that part of resistor 84 through which the motor current flows. This resistance is a function of the *angular difference* between shaft 230 (wiper 88) and the potentiometer case 85 (resistor 84). The applied resistance would, therefore, be independent of the angular displacement of either case 85 or shaft 206 from their respective positions at zero resistance inasmuch as the resistance is only dependent upon the *angular* difference existing between wiper 88 and resistor 84 regardless of their positions relative to their zero positions.

It can be seen, therefore, that index 194 is important only when considering time, however, since time is one of the two variables used in the operation of the device, it is necessary that it *always be considered*. Accordingly, it is important that the required time variable always align with index 194 in every computation involving rings 172 and 174 regardless of the variables furnished.

As an example, some published instrument approach procedure furnishes the pilot the altitude to be lost in the approach and the required rate of descent for his aircraft's particular approach (ground) speed. In this instance, time would be the unknown to be solved for in the equation Rate×Time=Altitude Difference.

By aligning the altitude difference (altitude to be lost during the approach) to index 194, and aligning the one minute index 196 on the time ring 174 to the specified rate of descent (on the chart) the time required for the maneuver would automatically align itself with index 194, thereby fulfilling the requirement that the required time is always to be aligned with index 194 for the reasons previously given.

An example of the preferred embodiment will now be discussed with reference being made to FIGURE 1 in which is provided a schematic illustration of the landing approach employing the subject invention. Assume that the pilot has consulted his approach facility chart and noted that the field minimum ceiling MDA (minimum descent altitude) is 400 feet above the field elevation, the initial altitude for an instrument approach is 3000 feet and that the approach inbound navigational fix point 232 is 10 miles from the airport. This inbound fix 232 can be either a vertically radiated radio beam, the intersection of two radio beams or bearings or any other detectable electronic position indication means appropriate for the approach. Assume also that the field elevation is 600 feet above sea level and that the aircraft has an approach ground speed of 120 miles per hour so that it will take five minutes for the aircraft to traverse the distance between the inbound fix 232 and the minimum descent point 234 at which point the glide path GP intersects the minimum ceiling MDA specified for the approach.

Adjustment of the pacer pointers to the initial or beginning altitude (3000 feet) for the altitude change maneuver (descent) is accomplished by the pilot's pushing the manual adjustment knob 44 inwardly to shift gear 40 from engagement with gear 38 to enable an easy rotation of shaft 42 for positioning of the pacer pointers 32 and 34 so that they are in alignment with the 3000 foot position on altimeter 20 as depicted at position P1, FIGURE 1.

The pilot can easily calculate the vertical distance D through which the aircraft must descend for the particular maneuver. This distance is equal to the approach altitude (3000 feet) minus the sum of the field elevation (600 feet) and the minimum ceiling (400 feet) and is, therefore, equal to a total distance of 2000 feet. The pilot then adjusts the manual adjustment knob 182 to position the "2000" foot marking on the outer ring 172 to alignment with the index 194 as shown in FIGURE 3. This adjustment also serves to position the movable contact wiper 88 of the rotary potentiometer 86 in a manner discussed previously. The pilot then adjusts manual control knob 192 so as to align the "5:00" (5 minutes) marking on the inner ring 174 with index wire 194. The positioning of inner ring 174 similarly positions the case and affixed resistor element 84 of potentiometer 86 in a manner discussed previously. The positioning of rings 172 and 174 also results in alignment of the feet per minute indicator index 196 (at the 1:00 minute marking on ring 174) with numeral "400" on ring 172 to indicate that the required rate of altitude change will be 400 feet per minute. With these settings, the potentiometer is automatically positioned so that the motor will drive the pacer pointers 32 and 34 so that they will traverse the dial 22 at that rate (400 f.p.m.) upon actuation of momentary switch 80.

The manually actuated switch 80 has remained in its disconnected (open) position illustrated in FIGURE 2 during the adjustment of circular slide rule rings 172 and 174. Therefore, motors 36 and 120 are deactivated.

It should be noted that the setting of time ring 174 simultaneously positioned lug 142 so that the time required for arm 138 to rotate into switching engagement with switch 68 will be equal to the time setting on ring 174; in this instance, five minutes.

The pilot will then maneuver the aircraft to assume level flight at 3000 feet on a proper heading to intersect inbound fix or localizer 232. The altimeter hands and pacer pointers will be in the relative positions illustrated at P1 in FIGURE 1. The setting of the circular slide rule is schematically illustrated beneath the altimeter for purposes of clarity and it should be understood that the slide rule will remain in this setting for the entire duration of the altitude change maneuver.

When the aircraft, which is flying on the required heading, intersects the inbound fix 232, the pilot immediately depresses momentary switch 80, which electrically engages coil which closes contact point 71, relay 72. Consequently, current from the voltage source 62 immediately flows through line 66, normally closed switch 68, switch 80 and through the coil of relay 72 to ground. Current through the coil of relay 72 causes the coil to close the normally open contact points of the relay thereby insuring continued actuation of the coil through line 73 despite the opening of switch 80 upon its release by the pilot. Consequently, the relay 72 is electrically latched. Current from line 70 flows through contacts 71, line 82, through a portion of resistor element 84, movable contact wiper 88, line 90, switch 104 and line 116 to variable speed motor 36 which, in turn, is connected to line 114 and switch 104 to ground. Consequently, closing of switch 80 results in the motor 36 immediately rotating at the proper speed to drive the pacer pointers 32 and 34 at a "400 feet per minute" descending traverse of dial 22 of altimeter 20. Therefore, maneuvering the aircraft so that the altimeter hands follow the movement of the pacer pointers 32 and 34 will result in a descent of the aircraft at a rate of 400 feet per minute.

The actuation of manual switch 80 also simultaneously causes current to flow through line 122 to the timer motor 120 and thence to ground through line 124 so that the timer motor immediately begins operation upon depression of switch 80. Clutch 128 is simultaneously actuated (engaged) upon energizing its coil 130. Consequently, the lever arm 138 begins rotating in a counter clockwise direction and will contact switch 68 five minutes after the switch 80 is depressed. It should be recalled that the initial position of lever arm 138 is determined by the position of lug 152 which, in turn, is determined by the "time" setting of potentiometer case 85.

Pacer pointers 32 and 34 continue to rotate in a descending manner and the pilot maneuvers the aircraft so that the altimeter hand follows the movement of the pacer pointers, which indicate the exact altitude at which the aircraft should be at all times during the entire descent. For example, at P2 assume that the pilot has erroneously allowed the aircraft to descend to an altitude of 2250 feet as pictorially illustrated. At this position, the pacer pointers 32 and 34 indicate that the aircraft should be at an altitude of 2600 feet as evidenced by the position of the pointers. The pilot, by looking at his altimeter, will be immediately aware that the aircraft is beneath the required altitude for that position of the glide path and will consequently make the required correction necessary to return to the glide path.

Position P3 illustrates the aircraft passing through 2000 feet altitude exactly in alignment with the required glide path. The hands of the altimeter and the pacer pointers are in exact alignment as shown and this fact indicates to the pilot that he is at the required altitude for that particular position.

Position P4 illustrates a condition in which the aircraft has risen above the programmed glide path to an altitude of 1750 feet whereas the actual programmed glide path altitude is 1500 feet at this position. The fact that the aircraft is above the programmed glide path is evidenced by the relative position of the altimeter hands and the pacer pointers 32 and 34. Consequently, the pilot is informed that he must make a correcting maneuver in order to bring the aircraft back to its required glide path for the descent.

Designator 234 represents the point at which the glide path GP intersects the minimum ceiling for the particular approach at that airport. Lever arm 138 will contact normally open switch 146 approximately four or five seconds before the aircraft reaches this point and will consequently close the contacts of switch 146 to actuate the light 164 and/or horn 166 to advise the pilot that he is approaching his specified minimum descent altitude as designated by point 234. Lever arm 138 will open the contacts of normally closed switch 68 at the time the aircraft arrives at this minimum descent altitude point 234. Opening of switch 68 will interrupt the current to relay 72, permitting the then closed normally open contact points 71 to open thereby breaking the circuit to motor 36, warning elements 164 and 166, timer 120 and clutch 128. The pacer pointers will then immediately stop (at the minimum descent altitude) and the pilot will be aware that he is at the minimum descent altitude and should stop all further descent. If the pilot cannot see the airport at this time, he will know that the airport is below minimum conditions and he will abort his landing approach and execute the appropriate missed approach procedure. However, if the landing runway is visible, the pilot will proceed to make the remainder of the approach by visual guidance to landing.

Spring 140 immediately rotates arm 138 counter clockwise into engagement with lug 142 when current flow to motor 120 and clutch 128 is interrupted by deactivation of relay 72. However, relay 72 cannot conduct current again until activated by switch 80 as previously described.

FIGURE 4 illustrates a simplified embodiment of this invention in which the instrument panel mounted circular slide rule 170 and the associated gearing for positioning the elements of the potentiometer are eliminated. In this embodiment, motor 36' is identical with motor 36 and drives pacer pointers in the exact same manner as illustrated in FIGURE 2. The motor is controlled by a manually selective reversing switch 104' and is connected by a line 82' to a conventional rotary potentiometer 86' which has a resistor element 84' and a movable contact wiper 88'. Current flows from a voltage source 62' through the variable voltage tap resistor element 84', wiper 88' and line 82' to motor 36'. The relative position of the wiper 88' and the resistor element 84' determines the speed with which motor 36' is operated. A timer 118' is manually set for the time selected for the altitude change maneuver desired and wiper 88' is similarly manually set for a required rate of altitude change. Wiper 88' is associated with a simple dial mounted on the instrument panel and having an indicator alignable with a scale of numbers calibrated in feet per minute altitude changes. Positioning of the pointer properly positions 88' so as to drive motor 36' at the required speed in conformity with the desired rate of altitude change. The required rate of altitude change can be calculated either mentally or by a separate slide rule operation if desired. The time required for the altitude change maneuver would be manually inserted in the timer 118' which would be of conventional variable elapsed time design (such as 91800 series push-button time switch manufactured by M. H. Rhodes, Inc. of Hartford, Conn.) and would terminate the flow of current to motor 36' after the expiration of the required time period. Moreover, the timer 118' also can operate switches to provide a visual and/or audible signal(s) as the time period termination for the maneuver is approaching in the manner analagous to the signals provided by elements 164 and 166 of the preferred embodiment.

Therefore, it will be obvious that the embodiment illustrated in FIGURE 4 would operate in the exact same manner as the preferred embodiment with the exception that the required rate of altitude change would have to be externally calculated as, for example, by a manual slide rule, whereas, the preferred embodiment requires no such calculation and the desired feet of altitude change and the time required for such are merely entered into an instrument panel mounted slide rule and automatically results in the control circuit assuming a position necessary to drive the pacer pointers at a required speed over the proper period of time.

Other modifications of this invention will occur to those skilled in the art. For example, it is quite possible that a linear type slide rule could be employed in place of the circular slide rule of the preferred embodiment. Similarly, a linear type potentiometer with modified drive means might be employed in place of the rotary potentiometer of the preferred embodiment.

Likewise, variable speed motor 36 could be controlled by any one of conventional means common to the art such as SCR (silicon controlled rectifier) or by use of a DC stepper motor whose pulse rate is controlled by its control equivalent of potentiometer 86 or by mechanical means.

What is claimed is:

1. An altimeter pacer system for use with an aircraft altimeter for enabling the maintaining of a desired rate of altitude change, said pacer system including movable pacer means movable at a settable predetermined rate to act as a pacer for movable altitude responsive indicating means of said altimeter and drive means for continuously moving said movable pacer means at said predetermined rate.

2. The system as described in claim 1, wherein said drive means includes an electric motor for driving said movable pacer means.

3. The system as described in claim 2, and including variable resistor means for controlling the speed of said motor.

4. The system as described in claim 1, additionally including computer means including scale means settable for altitude difference and scale means settable for the associated time period in which the altitude change is to be effected, means for controlling the rate of movement of said drive means, and means operatively connecting both of said scale means with said controlling means to control the rate of movement of said drive means in accordance with settings of said scale means settable for altitude difference and said scale means settable for said associated time period in which the altitude change is to be effected for time.

5. The system as described in claim 4, said scale means being marked in logarithmic spacings.

6. The system as described in claim 4, wherein said scale means settable for associated time periods is also settable for a given rate of altitude change.

7. The system as described in claim 5, wherein said means operatively connecting said scale means with said controlling means includes logarithmic linearising mechanism for causing numerically linear proportional movement of said controlling means.

8. The system as described in claim 7, wherein said controlling means additionally includes a linearly variable resistor and a wiper movable thereover, wherein said means operatively connecting said scale means with said controlling means comprises first and second individual connecting means each respectively connected between different ones of said scale means and said controlling means in which one of said first and second individual connecting means controls displacement of said resistor and the other of said first and second individual connecting means controls displacement of said wiper.

9. Means for enabling an aircraft altitude change maneuver through a given vertical distance in a given time period, said means comprising pacer means associated with an aircraft altimeter in the aircraft for rotative movement adjacent the altimeter dial about the axis of rotation of, and serving as a pacer guide for, the hands of the altimeter, drive means for continuously rotating said pacer means at a desired rotational speed, control means for controlling the speed of rotation of said drive means in accordance with the given vertical distance and given time period so that said pacer means will traverse the altimeter dial at a rate equal to the rate of altitude change necessitated by the particular given vertical distance and given time period for the maneuver and timer means for disabling the drive means for said pacer means when said pacer means have been driven for said given time period.

10. The invention of claim 9, wherein said control means includes a potentiometer with a rotatable wiper contact means and a rotatable resistor element with said rotatable resistor element and said rotatable wiper contact means being rotatable about a common axis of rotation, manually actuated means for rotating said rotatable wiper contact to a given position in accordance with the number of feet of altitude change desired for an aircraft maneuver, manual means for setting said rotatable resistor element to a given position in accordance with the number of minutes desired in which to accomplish said aircraft altitude change maneuver so that the resultant manual setting of said means for rotating the wiper contact and the means for rotating the resistor element results in a relative positioning of said rotatable wiper contact and said rotatable resistor element with respect to each other which results in providing a driving voltage for said drive means of such a value as to achieve said desired speed of rotation of said pacer means.

11. The invention recited in claim 10 wherein the said means for positioning said rotatable resistor element also sets said timer means to a value equal to said time for conducting said aircraft maneuver.

12. The invention of claim 9 wherein said control means includes a potentiometer having a relatively movable wiper member and resistor member and said drive means comprises a variable speed electric motor controlled by said potentiometer.

13. The invention of claim 12 wherein said control means additionally includes first and second manually adjustable means positionable to respectively indicate the vertical distance and time period for a maneuver and to position said wiper member and said resistor member to drive said motor at the required output speed and to also set said timer.

14. The invention of claim 13 additionally including warning means actuable by said timer a short time before said drive means is disabled so as to provide a signal to the aircraft pilot that expiration of the time period is imminent.

15. A pacer system for an aircraft altimeter comprising first and second pacer pointers mounted for rotation adjacent the altimeter face, variable speed electric motor means for driving said pacer pointers, a step-down gear train between said pacer pointers so that one of said pacer pointers is driven at a speed ten times the driven speed of the other of said pacer pointers, manually operable means for adjusting said pacer pointers to a desired initial altitude reading, speed control means for said motor including a potentiometer having a resistor element mounted for rotation on a rotatable support case, a rotatably mounted wiper member mounted for rotation about the same rotation axis of said support case, a manually adjustable circular slide rule including first and second coaxial rings, said first ring including indicia indicative of feet of altitude change desired for an altitude change maneuver, said second ring including indicia indicative of time required for said altitude change maneuver, manual control means for rotatably adjusting said rings and associated scales with respect to a fixed index member, gearing means including logarithmic linearizing gears connected between said first ring and said wiper member for rotatably positioning said wiper member in accordance with the adjusted position of said first ring, gearing means connecting said second ring and including logarithmic linearizing gears for rotatably positioning said support case of said potentiometer in accordance with the adjusted position of said second ring, an electrical connection between said motor and said rotatable wiper member, a source of voltage connected in series with said resistor member, the contacts of a latchable relay and a normally closed switch member so that the relative position of said rotatable wiper member and said rotatable resistor member will determine the speed of operation of said electric motor, a constant speed electric timing motor, electromagnetic clutch means connected to the output shaft of said constant speed electric motor and having an output shaft, a lever arm radially extended from and keyed to said output shaft of said electromagnetic clutch, spring means for biassing said lever arm in a rotational direction opposite the direction of rotation of said constant speed motor into engagement with a lug extending from said support case of said potentiometer, electrical circuit means connected to said relay so that actuation of said relay simultaneously actuates said constant speed motor and said electromagnetic clutch, support means for said normally closed switch positioning said normally closed switch to be engaged by said lever arm after said lever arm has been drivingly rotated by said constant speed motor for a time period equal to the time period indicia on said second ring aligned with said fixed index so that rotation of said lever arm will cause said lever arm to engage said normally closed switch to open the contacts of said normally closed switch and interrupt the current to said latchable relay to unlatch said latchable relay and therefore interrupt the flow of current to said variable speed motor and to said constant speed motor and a second switch having normally opened contacts and mounted upon said support member to be engaged by said lever arm a short time before said lever arm engages said normally closed switch, circuit means connected to said normally open switch so that the closing of the contacts of said normally open switch will actuate warning means indicating that termination of said time period is imminent.

References Cited
UNITED STATES PATENTS

| | | | |
|---|---|---|---|
| 1,355,829 | 10/1920 | Ford | 340—309.2 |
| 3,117,312 | 1/1964 | Watson | 340—316 |
| 3,152,248 | 10/1964 | Deschamps | 235—150.22 |
| 3,165,745 | 1/1965 | Pike et al. | 343—108 |
| 3,230,507 | 1/1966 | Holt | 340—23 |
| 3,381,656 | 5/1966 | Ohnikian | 340—27 X |

MALCOLM A. MORRISON, Primary Examiner

R. W. WEIG, Assistant Examiner

U.S. Cl. X.R.

340—23, 27; 343—108